United States Patent [19]

Rosenbaum

[11] Patent Number: 4,890,967
[45] Date of Patent: Jan. 2, 1990

[54] BOLT CAP DEVICE

[75] Inventor: Amir P. Rosenbaum, Cupertino, Calif.

[73] Assignee: Spectre Industries, Inc., San Jose, Calif.

[21] Appl. No.: 106,551

[22] Filed: Oct. 6, 1987

[51] Int. Cl.$^4$ .................. F16B 19/00; F16B 33/00
[52] U.S. Cl. ........................... 411/372; 411/377; 411/431; 411/910
[58] Field of Search ............... 411/371–373, 411/377, 429–431, 910

[56] References Cited

U.S. PATENT DOCUMENTS

| | | | |
|---|---|---|---|
| 2,819,642 | 1/1958 | Refrigeri | 411/373 |
| 3,485,134 | 12/1969 | Ott | 411/372 |
| 4,041,833 | 8/1977 | Wagner | 411/372 |
| 4,167,886 | 9/1979 | Seghezzi et al. | 411/4 |
| 4,293,243 | 10/1981 | Graybeal et al. | 411/373 |
| 4,582,462 | 4/1986 | Thiel | 411/431 |
| 4,659,273 | 4/1987 | Dudley | 411/910 |

Primary Examiner—Neill R. Wilson
Attorney, Agent, or Firm—Hecker & Harriman

[57] ABSTRACT

A protective and decorative cover for application to bolts, nuts and the like. The cover comprises a retainer made of a resilient compressible material having legs which align with the flats of a bolt head or nut. A generally cylindrical cap is then applied over the retainer. The internal diameter of the cap provides an interference fit with the legs of the retainer thereby compressing them against the flats of the bolt or nut. The exposed head of the bolt or the nuts is thus fully enclosed by the cap and protected from the elements. The cap may have a decorative shape and finish that is particularly desirable in automotive, motorcycle and marine applications.

11 Claims, 2 Drawing Sheets

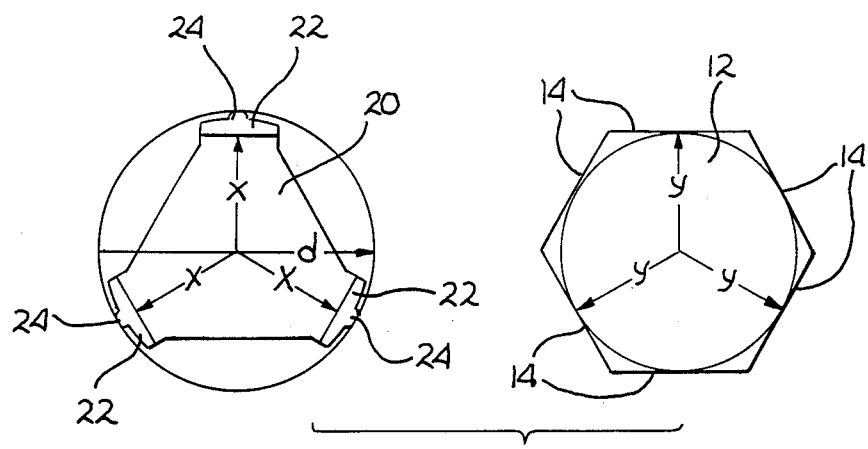
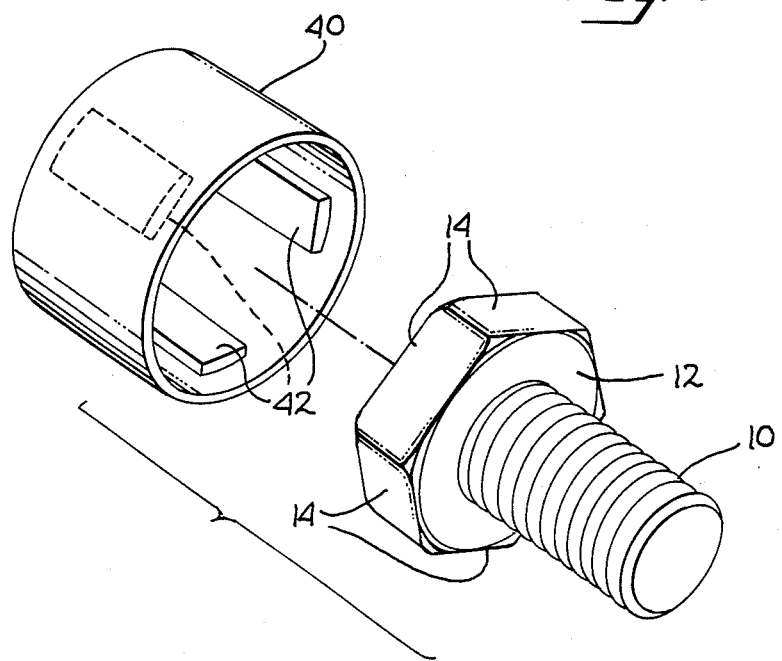

BOLT CAP DEVICE

BACKGROUND OF THE INVENTION

1. Field of the Invention

The present invention relates to a protective cover for bolt heads and nuts, and more particularly, to a decorative bolt cap for use in automotive, motorcycle and marine applications.

2. Background Art

Many articles of manufacture, and particularly automobiles, employ threaded bolts and nuts to secure various components. For example, automobile engines use numerous bolts to hold the engine together and also to attach ancillary pieces of equipment, brackets, etc. Many such bolts are exposed to the elements and to view.

It is frequently desirable to protect the exposed heads of bolts or exposed nuts so as to prevent corrosion and accumulation of grease and dirt. Furthermore, and even more important to many owners of automobiles, it is often desirable to provide a decorative cover or cap for exposed bolt heads and nuts.

One approach that has been taken to protect and cover exposed bolt heads in a cosmetically pleasing manner is to have such bolts chrome plated. To accomplish this, new plated bolts must be purchased or existing bolts must be removed, polished, plated and then reinstalled. In either case, the process is time-consuming and expensive. Although chrome plated bolts have a cosmetically pleasing appearance, the chrome plate is prone to damage when a wrench is applied. Once the plating has been damaged, the bolt is again subject to corrosion and the cosmetic appearance is lost.

Another approach that has been taken to provide improved bolt head appearance and protection is to employ a cup shaped washer that fits under the bolt head and extends around the exposed circumference of the bolt head. When using such cup washers, it is necessary to replace the existing bolts with allen head bolts to accomodate the "cup washer" design. This method is also time consuming and expensive in that the existing bolts must be removed and replaced with allen head bolts and the cup washers must then be installed. Furthermore, the cup washer alone does not conceal or provide protection for the exposed surface of the bolt head. A separate button shaped cap is required. The cap has a protruding post on the underside thereof with a circumferential groove in which a small O-ring is located. The post is inserted into the hex-shaped recess of the allen head bolt and is held in place by compression of the O-ring. Those caps, it has been found, may jar loose from vibration.

Yet another approach to providing a protective and decorative cover for a bolt head is use of a single cap with an internal O-ring. Such cap includes an internal cylindrical wall having a milled groove that retains an O-ring. The O-ring grasps the corners of a hex-headed bolt or the knurled surface of an allen head bolt. Installation of such caps typically requires lubrication with a small amount of oil. This allows the cap to go on smoothly, but also makes it more likely to fall off when subjected to vibration. Also, because these caps must have a groove milled in the interior surface to retain the O-ring, they have a relatively thick wall that precludes their application in many areas having close clearances. Furthermore, the machining of the groove and the O-ring results in additional expense and operations of manufacture.

As described below, the present invention provides a simple and inexpensive bolt cover that may be used on conventional hex-headed bolts such as those that come as stock fasteners in automobile engines. The cap is securely retained on the bolt head and provides protection from the elements and a decorative appearance.

SUMMARY OF THE INVENTION

The present invention consists of a locking retainer member that fits over the flats of a standard hex-headed bolt and a cap having a generally cylindrical inner surface that fits over the retainer. The retainer is made of a resilient material such as nylon and is designed such that it abuts the lateral flats of the bolt head when the cap is installed. The cap itself may be of various designs and materials, thereby permitting a variety of decorative appearances to be achieved. The cylindrical inner surface of the cap compresses the retainer against the flats of the bolt head as the cap is installed over the retainer, thereby securing both the cap and retainer to the bolt head.

In an alternative embodiment of the present invention, the cap is made of a suitably resilient material and incorporates retaining means molded into the internal surface of the cap to provide a one-piece bolt cap.

BRIEF DESCRIPTION OF THE DRAWINGS

FIG. 7 illustrates certain critical dimensions of the present invention.

FIG. 8 illustrates an alternative embodiment of the present invention.

DETAILED DESCRIPTION OF THE PREFERRED EMBODIMENTS

Figure 1:
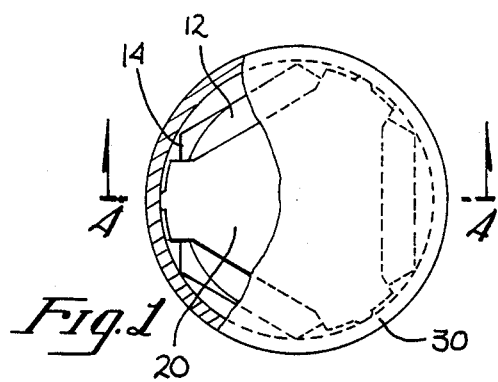
FIG. 1 is a partially cut-away top view of the present invention.
Figure 3:
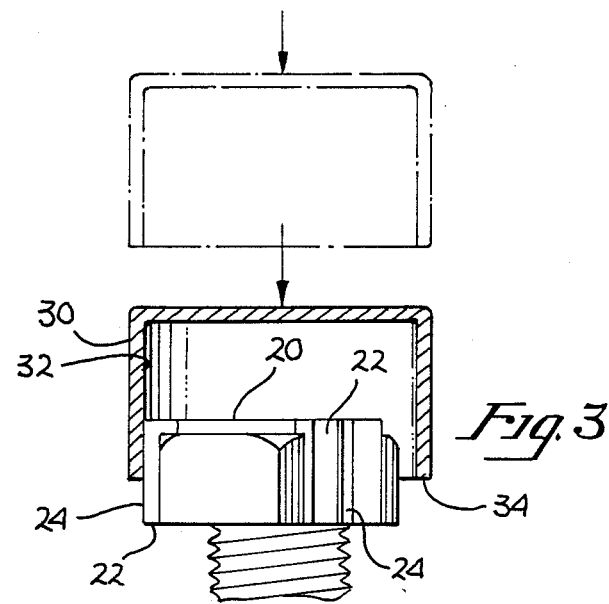
FIG. 3 is a cross sectional view of the present invention illustrating assembly of the cap with the retainer.

A protective and decorative bolt cap having particular application to automobiles, motorcycles and boats is disclosed. In the following description, for purposes of explanation, specific numbers, dimensions, materials, etc. are set forth in order to provide a thorough understanding of the present invention. However, it will be apparent to those skilled in the art that variations of these specific details lie within the scope of the present invention.

Referring to FIGS. 1–5, a standard threaded bolt 10 is shown having a bolt head 12 that includes a plurality, typically six, of flats 14. Such bolts are widely used as fastening elements in all types of articles, including automobile, motorcycle and marine engines. Industrial standards have been established to specify the dimensions of such bolts, in both metric and English system of measure, and particularly the distance between opposing lateral flats 14 of the bolt head 12. These standardized dimensions insure that standard size wrenches will cooperatively engage with the bolt head.

Retainer 20 is made of a resilient material that will restore to its preflexed position following flexure. In the present preferred embodiment, a resilient plastic such as nylon is ideally suited. However, other materials with similar properties may also be suitable. Legs 22 of retainer 20 are disposed so as to align with at least some of the flats 14 of bolt 10. In the preferred embodiment, three legs 22 are employed for application to hex-headed bolts. However, any number of suitably arranged legs may be used provided they correspond to the flats or corresponding surfaces of the bolt head.

The dimensions of retainer 20 are substantially determined by the standardized dimensions of bolt head 12 as described above. In particular, the dimensions designated x in FIG. 7 are approximately equal (within a tolerance of approximately 0.001 inch) to the nominal dimensions desiqnated y of a standard bolt head 12. Thus, retainer 20 is easily press engaged over bolt head 12. Legs 22 align with flats 14 when retainer 20 is placed over bolt head 12 and, because of the lack of clearance, retainer 20 is held in place thereon. Due to normal manufacturing tolerances, the dimensions of bolt head 12 may vary from nominal dimensions by several thousandths of an inch. Even if dimensions y of FIG. 7 are greater than dimensions x, retainer 20 can still be press engaged over bolt head 12 with an interference fit due to the resilience of the material from which retainer 20 is made.

Figure 4:
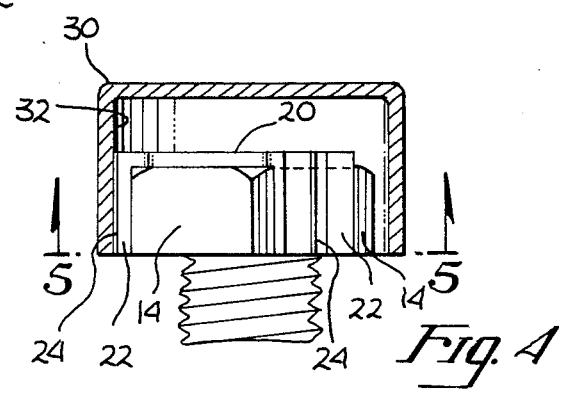
FIG. 4 is a cross-sectional view of the present invention along line 4—4 of FIG. 1.

Each of legs 22 of retainer 20 have a rounded longitudinal rib 24. The apexes of ribs 24 define an external diameter of retainer 20, designated d in FIG. 7. Cap 30 has a generally cylindrical inner surface 32, the diameter of which is approximately 0.003 inches less than dimension d. This creates an interference fit between ribs 24 and internal surface 32 of cap 30. As cap 30 is fully pressed over retainer 20 as shown in FIG. 4, legs 22 are slightly compressed, thereby firmly securing the assembly of cap 30 and retainer 20 to bolt 10.

Figure 2:
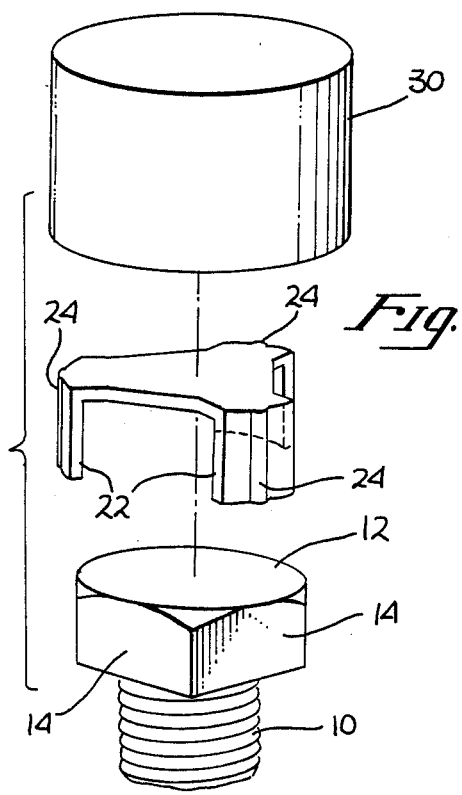
FIG. 2 is an exploded view of the present invention.

Cap 30 may be fashioned in a variety of decorative shapes and materials. For example, cap 30 may have a cylindrical outer surface as illustrated in FIG. 2 or may have a plurality of flats. Furthermore, the outer surface of cap 30 may be smooth, knurled or machined in some other decorative manner. In the present preferred embodiment, preferred materials for cap 30 are aluminum, which may be annodized in a variety of colors and finishes, and steel which may be chrome plated. Cap 30 may also be made of a plastic material that can be molded in colors or plated.

When using the present invention, retainer 20 is first placed over bolt head 12 with legs 22 in alignment with flats 14. Due to the zero-clearance or interference fit between legs 22 and flats 14 as previously described, retainer 20 is retained on bolt head 12. Therefore, retainer 20 may be applied to bolt head 12 regardless of the physical orientation of bolt 10. Once placed over bolt head 12, retainer 20 generally need not be held in place manually by the user unless the dimensions of bolt head 12 are substantially undersize. After applying retainer 20, cap 30 is pressed down and over retainer 20 compressing legs 22 against flats 14 and firmly securing both cap 30 and retainer 20 to bolt 10.

Once applied as decribed above, cap 30 will remain firmly attached to bolt 10 even in the presence of vibrations which are normally encountered in automotive applications and even if the bolt is inverted with the bolt head facing downwardly. To remove cap 30, any suitable prying instrument, such as a blade of a screwdriver, is inserted under rim 34 and cap 30 is pryed off of retainer 20. Retainer 20 may then be manually removed from bolt head 12. Because retainer 20 is made of a suitably resilient material, such removal will not preclude subsequent reapplication of retainer 20 and cap 30 to bolt 10.

Figure 6:
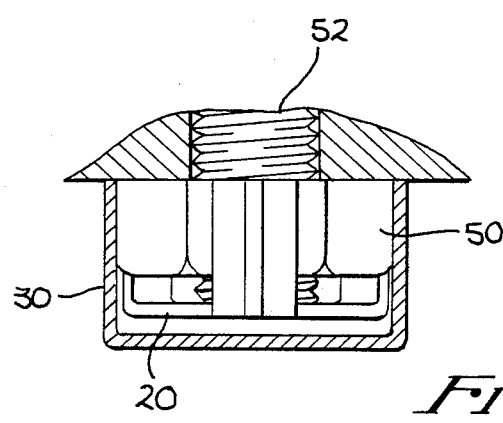
FIG. 6 is a cross-sectional view of the present invention installed on a nut.
Figure 5:
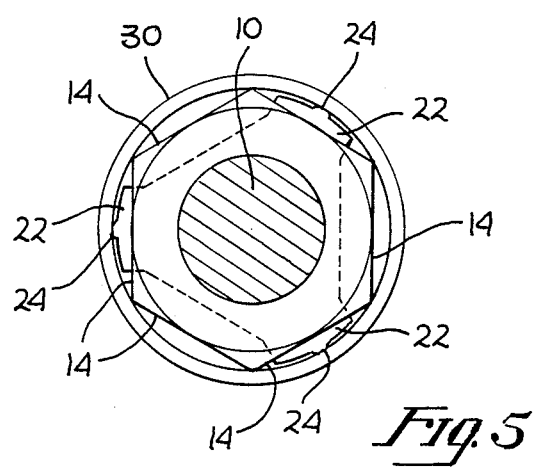
FIG. 5 is a cross-sectional view of the present invention long line 5—5 of FIG. 4.

Although the foregoing description has been with reference to bolt 10, it is to be understood that the present invention is equally applicable to a nut or other fastening device having flats similar to flats 14 of bolt 10. It is desirable that legs 22 be somewhat longer than the longitudinal dimension of flats 14 so that retainer 20 may be applied to a nut having a domed outer surface or a nut 50 through which some portion of a mating bolt 52 or stud protrudes as shown in FIG. 6.

FIG. 8 illustrates an alternative embodiment of the present invention. Cap 40 is generally similar to cap 30 as previously described, however, it includes bosses 42 molded on the internal surface thereof. Bosses 42 function in a manner similar to legs 22 of the previously described embodiment by gripping flats 14 of bolt head 12. In this embodiment, cap 40 is preferably made of a resilient compressible material such as nylon or ABS plastic.

I claim:

1. A removable and reusable cover for covering an exposed portion of a fastener, said exposed portion including a plurality of radially disposed external flat surfaces, said cover comprising:
    a retainer having a plurality of legs that align with at least two of said flat surfaces, and
    a removable cap for compressing and elastically deforming said legs between said flat surfaces and said cap, said cap retained in place by said retainer and substantially immobile with respect to said fastener.

2. The cover of claim 1 wherein said cap has a generally cylindrical cavity for enclosing said fastener and for compressing said legs of said retainer.

3. The cover of claim 2 wherein said retainer has three legs.

4. The cover of claim 3 wherein said retainer is made of nylon.

5. The cover of claim 4 wherein said cap is made of aluminum.

6. The cover of claim 4 wherein said cap is made of steel.

7. A removable and reusable cover for enclosing an exposed portion of a threaded fastener, said exposed portion including a plurality of radially disposed external flat surfaces, said cover comprising:
    a retainer having a flat base portion and a plurality of legs extending perpendicular thereto disposed so as to align with some of said flat surfaces and,
    a removable cap having a generally cylindrical cavity, the diameter of said cavity being such as to compress and elastically deform said legs between said flat surfaces and said cap when said cap is pressed over said retainer in an axial direction, said cap retained in place by said retainer and substantially immobile with respect to said fastener.

8. The cover of claim 7 wherein said retainer has three legs.

9. The cover of claim 8 wherein said retainer is made of nylon.

10. The cover of claim 9 wherein said cap is made of aluminum.

11. The cover of claim 9 wherein said cap is made of steel.

* * * * *